(12) United States Patent
Thorn et al.

(10) Patent No.: US 11,290,601 B1
(45) Date of Patent: Mar. 29, 2022

(54) TECHNIQUES FOR MANAGING ALBUM ARTWORK IMAGES

(71) Applicant: Apple Inc., Cupertino, CA (US)

(72) Inventors: Matthew H. Thorn, Seattle, WA (US); Sean M. Harold, San Jose, CA (US); Alan Lee, San Jose, CA (US); Nathaniel P. Marrin, San Jose, CA (US); Jose J. Aroche Martinez, San Jose, CA (US); Leticia M. Alarcon, San Jose, CA (US); Juliana Diaz Delgado, San Jose, CA (US); Adhamh C. Findlay, Austin, TX (US); Mark K. Su, San Francisco, CA (US); Ómar K. Yasin, Vancouver (CA); Kenneth F. Rogers, Oakland, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/169,382

(22) Filed: Feb. 5, 2021

Related U.S. Application Data

(60) Provisional application No. 63/085,101, filed on Sep. 29, 2020.

(51) Int. Cl.
*G06K 15/00* (2006.01)
*H04N 1/00* (2006.01)

(52) U.S. Cl.
CPC ..... *H04N 1/00196* (2013.01); *H04N 1/00156* (2013.01); *H04N 1/00167* (2013.01); *H04N 1/00183* (2013.01)

(58) Field of Classification Search
CPC .......... H04N 1/00196; H04N 1/00198; H04N 1/00204; H04N 1/00156; H04N 1/00167; H04N 1/00169; H04N 1/00183
See application file for complete search history.

(56) References Cited

U.S. PATENT DOCUMENTS

| 2009/0089312 | A1* | 4/2009 | Chi ..................... G06F 16/9038 |
| 2012/0239526 | A1* | 9/2012 | Revare .................. G06Q 30/06 705/26.8 |
| 2014/0075324 | A1* | 3/2014 | Howard .................. G06F 9/451 715/738 |
| 2014/0365895 | A1* | 12/2014 | Magahern ............... G06F 3/016 715/727 |

* cited by examiner

*Primary Examiner* — Moustapha Diaby
(74) *Attorney, Agent, or Firm* — Dickinson Wright RLLP

(57) ABSTRACT

A server computing device can execute the steps of (1) managing a plurality of album artwork templates, wherein each album artwork template of the plurality of album artwork templates includes a plurality of entries, and each entry of the plurality of entries defines a respective manner by which a respective album artwork image is to be generated, (2) receiving, from a client device, a request for an album artwork image, wherein the request includes: a first identifier that corresponds to a particular image of an artist, a second identifier that corresponds to a particular album artwork template of the plurality of album artwork templates, and locale information that corresponds to a particular entry of the particular album artwork template, and (3) generating the album artwork image according to the respective manner defined by the particular entry, wherein the album artwork image is based at least in part on the particular image of the artist.

20 Claims, 15 Drawing Sheets

TECHNIQUES FOR MANAGING ALBUM ARTWORK IMAGES

CROSS-REFERENCE TO RELATED APPLICATIONS

The present application claims the benefit of U.S. Provisional Application No. 63/085,101, entitled "TECHNIQUES FOR MANAGING ALBUM ARTWORK IMAGES," filed Sep. 29, 2020, the content of which is incorporated herein by reference in its entirety for all purposes.

FIELD

The described embodiments relate generally to techniques for managing album artwork images. In particular, the described embodiments set forth techniques for dynamically generating album artwork images that, for example, incorporate artist images, design layers, and textual information written in different languages.

BACKGROUND

Album artwork for a given album typically is created manually by a combination of photographers and designers. This has been a tenable approach for many years given the average music artist releases albums on a relatively low periodic basis.

The rise in popularity of music applications has increased the number of playlists (both user and machine generated) that include a variety of songs from the same or different artists. It is desirable for these playlists to be assigned album artwork images that are representative of the nature of the playlists. In this regard, the traditional—i.e., manual—approach for creating album artwork has become untenable, especially in view of the numerous languages spoken by individuals who access these playlists. Moreover, many artists desire to frequently modify their representative images—e.g., portrait images, symbols, etc.—which causes existing album artwork that incorporates previous images of the artists to become outdated.

Accordingly, what is needed is an improved approach for managing album artwork images within a music streaming service.

SUMMARY

The representative embodiments set forth herein disclose various techniques for managing album artwork images.

One embodiment sets forth a method for generating album artwork images. According to some embodiments, the method can be implemented at a server computing device, and include the steps of (1) managing a plurality of album artwork templates, wherein each album artwork template of the plurality of album artwork templates includes a plurality of entries, and each entry of the plurality of entries defines a respective manner by which a respective album artwork image is to be generated, (2) receiving, from a client device, a request for an album artwork image, wherein the request includes: a first identifier that corresponds to a particular image of an artist, a second identifier that corresponds to a particular album artwork template of the plurality of album artwork templates, and locale information that corresponds to a particular entry of the particular album artwork template, and (3) generating the album artwork image according to the respective manner defined by the particular entry, wherein the album artwork image is based at least in part on the particular image of the artist.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The described embodiments relate generally to techniques for managing album artwork images. According to some embodiments, one or more server computing devices can be configured to manage a collection of album artwork templates, where each album artwork template in the collection of album artwork templates defines a manner in which a collection of album artwork images should be generated. According to some embodiments, each album artwork image in a collection of album artwork images for a given album artwork template can be based at least in part on an image of an artist, one or more design layers, and textual information that is written in a respective language. Conversely, client devices can be configured to, when issuing requests to the server computing devices for album artwork images, include a reference to an image of an artist, a reference to an album artwork template, and a reference to a locale. In this manner, the recipient server computing devices can utilize the information in the requests to generate and provide the appropriate album artwork images to the requesting client computing devices.

Figure 1A:
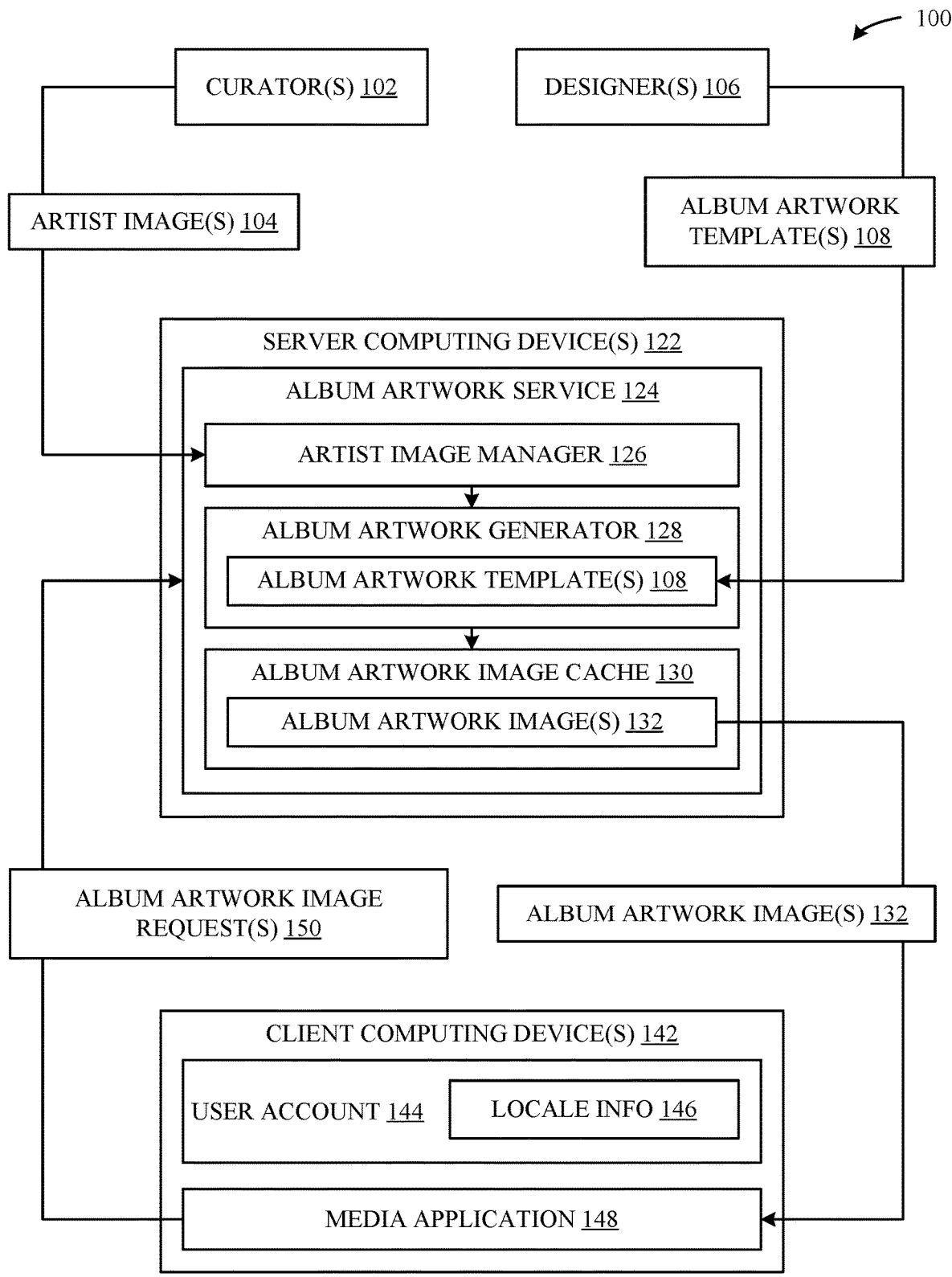
FIGS. 1A-1B illustrate block diagrams of different computing devices and data objects that can be configured to implement different aspects of the various techniques described herein, according to some embodiments.

FIG. 1A illustrates a block diagram 100 of one or more server computing devices 122 that can be configured to implement various aspects of the techniques described herein. According to some embodiments, each server computing device 122 can represent any form of computing device, e.g., a smartphone, a tablet, a wearable, a desktop computing device, a rack-mounted computing device, and so on. It is noted that the foregoing examples are not meant to be limiting. On the contrary, each server computing device 122 can represent any form of computing device without departing from the scope of this disclosure. Although not explicitly illustrated in FIG. 1A, a given server computing device 122 can include at least one processor, at least one memory, and at least one storage device that can operate in conjunction to enable the server computing device 122 to implement the various techniques set forth in this disclosure.

According to some embodiments, and as shown in FIG. 1A, the server computing device 122 can be configured to implement an album artwork service 124. According to some embodiments, the album artwork service 124 can be configured to implement an artist image manager 126, an album artwork generator 128, and an album artwork image cache 130. It is noted that foregoing entities implemented by the album artwork service 124 can be implemented separately from the album artwork service 124 within the server computing device 122 or other server computing devices 122. Individual descriptions of the various functionalities provided by these entities are provided in the following paragraphs.

According to some embodiments, the artist image manager 126 can be configured to receive artist images 104 (e.g., from one or more curators 102) and store the artist images 104 into a non-volatile memory. In one example, the artist image manager 126 can manage a collection of user accounts, where each user account corresponds to an individual (e.g., an artist) or an entity (e.g., an agent of an artist) that is authorized to upload images of the artist to be displayed in association with a music service (not illustrated in FIG. 1A). According to some embodiments, and as illustrated in the block diagram 160 of FIG. 1B, the artist image manager 126 can, upon receipt of a given artist image 104, assign an artist image identifier 162 to the artist image 104 so that the artist image 104 can be uniquely identified within the album artwork service 124.

According to some embodiments, the artist image manager 126 can be configured to implement machine learning techniques to modify a given artist image 104 in a manner that focuses on one or more individuals that are included in the artist image 104. This can involve, for example, cropping areas of an artist image 104 that do not include faces (while leaving an adjustable margin), carrying out panning and zooming operations, introducing alpha-channel regions that eliminate certain details, and the like, to yield an updated artist image 104 that places emphasis on one or more faces included in the artist image 104. It is noted that the foregoing operations are not meant to be limiting, and that any image-specific operations can be used to place emphasis on faces included in artist images 104 without departing from the scope of this disclosure.

According to some embodiments, the album artwork generator 128 can be configured to generate album artwork images 132 in accordance with the various techniques set forth herein. To achieve this functionality, the album artwork generator 128 can be configured to receive one or more album artwork templates 108 from one or more designers 106 that are known to the album artwork generator 128. According to some embodiments, and as illustrated in FIG. 1B, the album artwork generator 128 can assign a respective album artwork template identifier 171 to each album artwork template 108 so that it can be uniquely identified within the album artwork service 124.

Figure 1B:
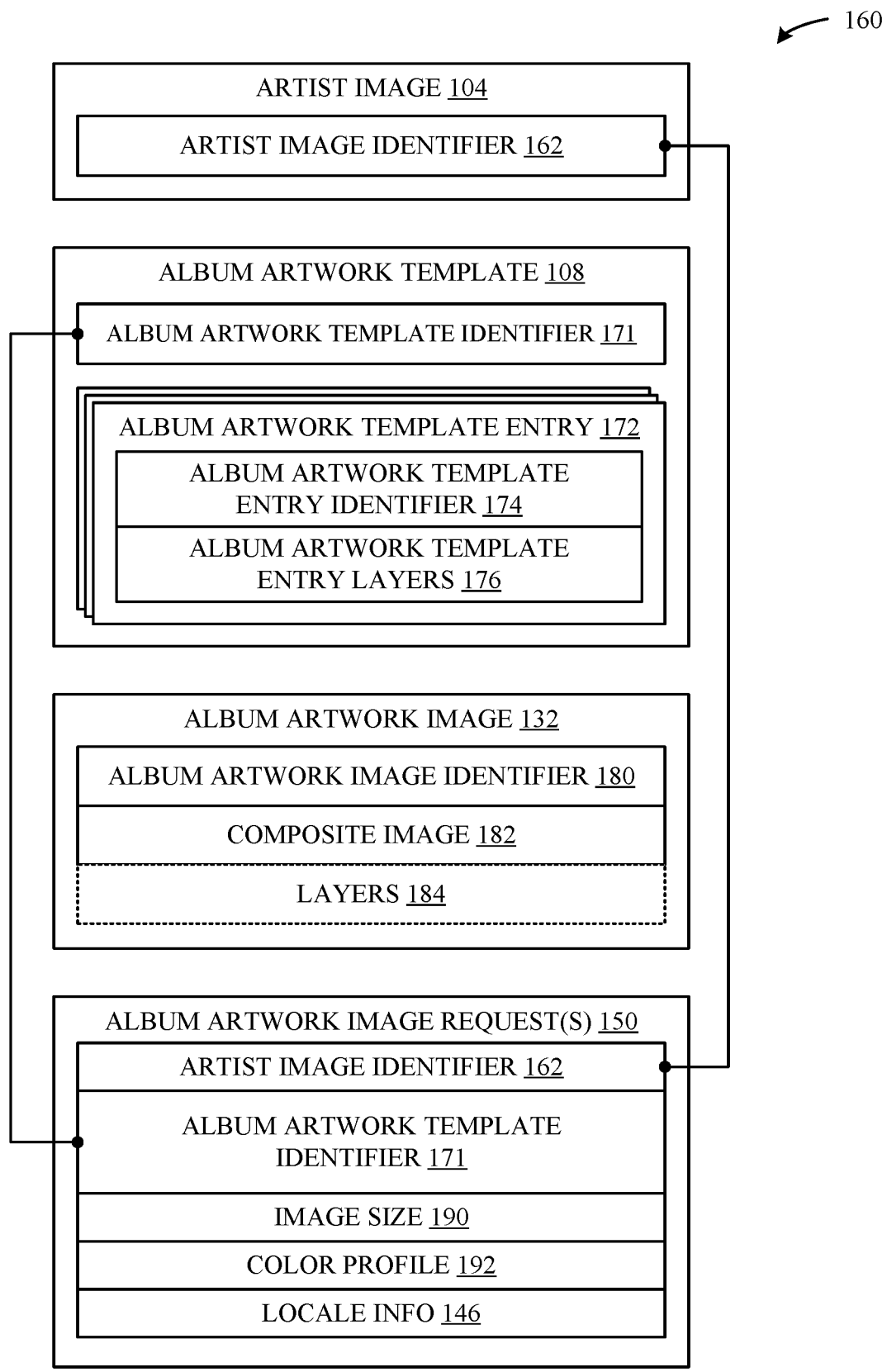

According to some embodiments, and as illustrated in FIG. 1B, each album artwork template 108 can be configured to include a collection of album artwork template entries 172. The album artwork generator 128 can assign a respective album artwork template entry identifier 174 to each album artwork template entry 172 so that the album artwork template entry 172 can be uniquely identified within the album artwork service 124. According to some embodiments, each album artwork template entry 172 can include one or more album artwork template entry layers 176 that enable the album artwork generator 128 to generate a respective album artwork image 132.

Figure 2A:
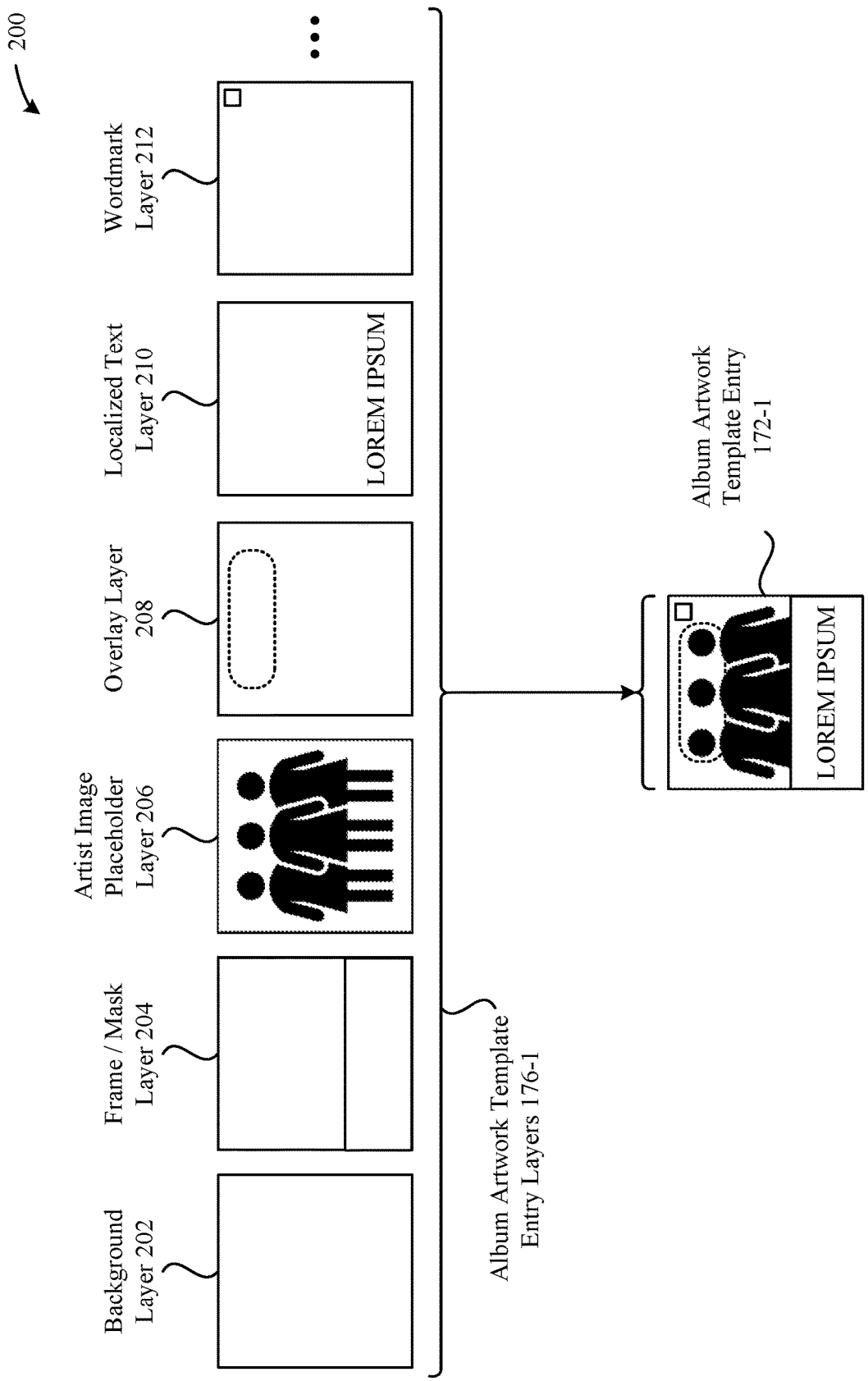
FIGS. 2A-2B illustrate conceptual diagrams for the manner in which album artwork templates can be implemented, according to some embodiments.

The conceptual diagram 200 of FIG. 2A illustrates an example configuration of an album artwork template entry 172-1. As shown in FIG. 2A, the album artwork template entry 172-1 can include at least six album artwork template entry layers 176-1—a background layer 202, a frame/mask layer 204, an artist image placeholder layer 206, an overlay layer 208, a localized text layer 210, and a wordmark layer 212. It is noted that the various layers illustrated in FIG. 2A are not meant to be limiting, and that any number of layers, each having any form of design or purpose, can be included in the album artwork template entry layers 176-1 without departing from the scope of this disclosure. According to some embodiments, the artist placeholder layer 206 represents a layer that incorporates at least a portion of an artist image 104 that is to be shown in an album artwork image 132 produced using the album artwork template entry 172-1.

Figure 2B:
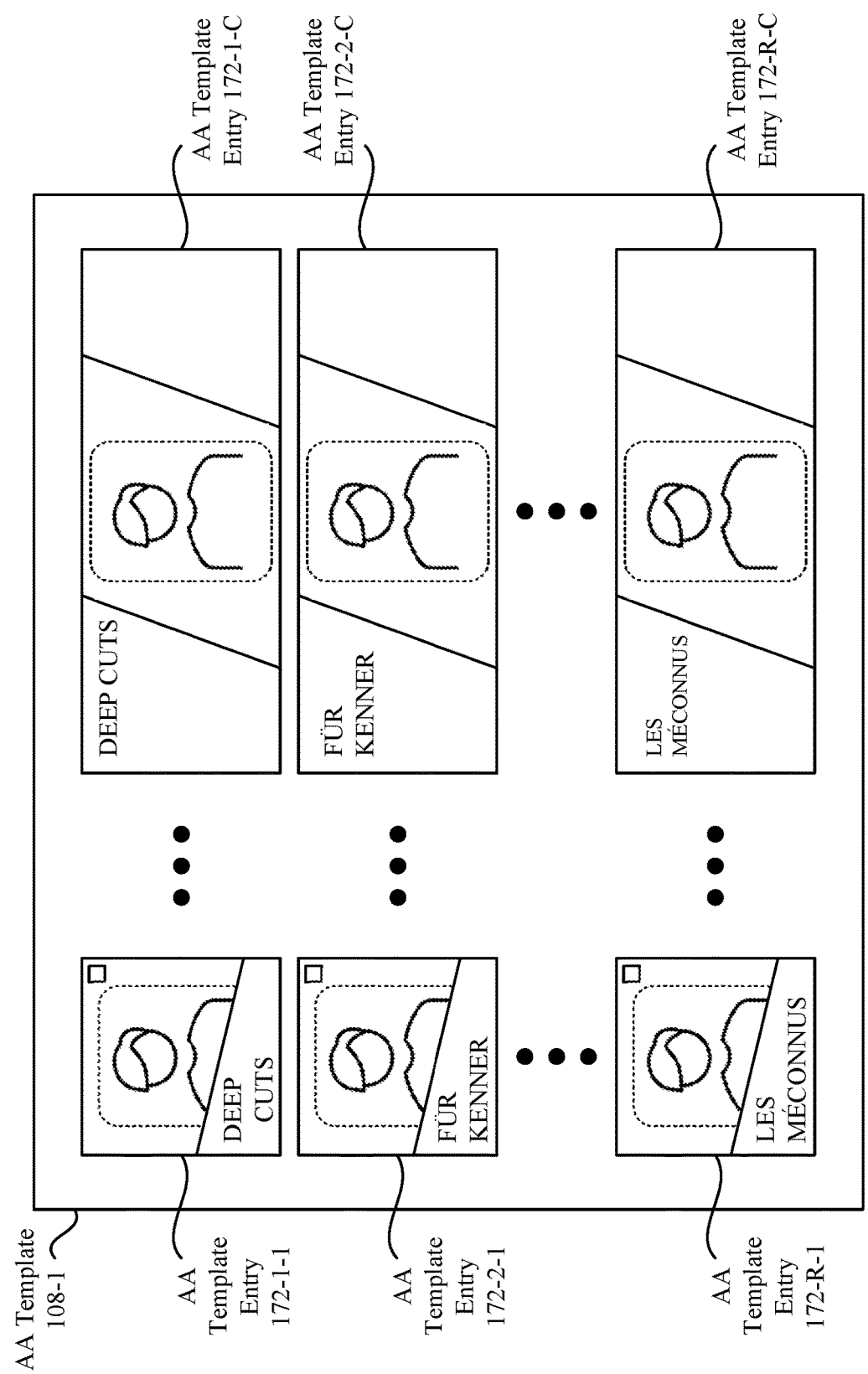

The conceptual diagram 250 of FIG. 2B illustrates an example album artwork template 108-1 that includes a collection of example album artwork template entries 172-R-C. As shown in FIG. 2B, each album artwork template entry 172 can implement a subset design that is different from a general design shared by the album artwork template entries 172-R-C. For example, the album artwork template entries 172 in the leftmost column share the same size and design characteristics, but each of the album artwork template entries 172 possesses textual information that is written in a different language. In another example, the album artwork template entries 172 in the rightmost column share the design and language characteristics of the corresponding album artwork template entries 172 in the leftmost column but possess different size characteristics. It is noted that each album artwork template 108 can include any number of album artwork template entries 172 without departing from the scope of this disclosure.

Turning back now to FIG. 1A, it is noted that the album artwork generator 128 can be configured to perform any number of translation operations on album artwork templates 108 to optimize the manner in which the album artwork generator 128 is able to produce album artwork images 132 based on the album artwork templates 108. For example, album artwork templates 108 designed using Sketch, Photoshop, XD templates, etc., can be converted by the album artwork generator 128 into JavaScript to optimize the manner in which the album artwork generator 128 generates album artwork images 132. It is noted that the foregoing software entities and example translation scenarios are not meant to be limiting, and that any software entities and translation techniques (or no translations at all) can be implemented without departing from the scope of this disclosure Turning back now to FIG. 1B, each album artwork image 132 can be associated with an album artwork image identifier 180 so that the album artwork image 132 can be identified by the album artwork service 124. According to some embodiments, each album artwork image 132 can include a composite image 182, e.g., a flattened representation of the various layers of the album artwork template entry 172 used to generate the album artwork image 132. Alternatively, or additionally, each album artwork image 132 can include one or more layers 184, e.g., one or more of the layers included in the album artwork template entry 172 used to generate the album artwork image 132, one or more additional layers, and so on. A given album artwork image 132 that includes layers 184 can enable a recipient of the album artwork image 132 to display the album artwork image 132 with enhanced functionality, e.g., to create a parallax effect, to establish an option to display or hide one or more of the layers, and the like.

According to some embodiments, and as shown in FIG. 1A, one or more client computing devices 142 can be configured to interact with the server computing devices 122 to obtain album artwork images 132. Although not explicitly illustrated in FIG. 1A, a given client computing device 142 can include at least one processor, at least one memory, and at least one storage device that can operate in conjunction to enable the client computing device 142 to implement the various techniques set forth in this disclosure. According to some embodiments, each client computing device 142 can be associated with a user account 144 and locale information 146. According to some embodiments, the locale information 146 can represent a language preference of a user of the client computing device 142. Each client computing device 142 can also execute a media application 148 that is configured to issue album artwork requests 150 as the user browses through albums that are accessible to the media application 148 (e.g., locally, via music streaming service, etc.).

An example format of an album artwork request 150 is illustrated in FIG. 1B, which includes properties such as an artist image identifier 162 (as previously described herein), an album artwork template identifier 171 (as also previously described herein), an image size 190, a color profile 192, and locale information 146. It is noted that the foregoing properties are not meant to be limiting, and that any number of properties can be included in the album artwork request 150 without departing from the scope of this disclosure. According to some embodiments, the album artwork requests 150 can be transmitted in the form of Uniform Resource Locators (URLs) that include values for one or more of the aforementioned properties. This approach is not intended to be limiting. On the contrary, the embodiments set forth herein contemplate any known means for the album artwork requests 150 to be formulated and transmitted between the client computing devices 142 and the server computing devices 122.

In any case, the album artwork service 124 can, in response to receiving an album artwork request 150 from a client computing device 142, provide an album artwork image 132 back to the client computing device 142. A detailed description of how the album artwork service 124 provides this functionality is described below in conjunction with FIGS. 3A-3G, FIGS. 4A-4B, and FIG. 5.

Additionally, the album artwork image cache 130 can be configured to store album artwork images 132. The album artwork image cache 130 can enable the album artwork generator 128 to forego generating album artwork images 132 when certain conditions are satisfied. For example, the album artwork generator 128, upon receiving a request to generate an album artwork image 132, can first perform a lookup in the album artwork image cache 130 to determine whether the album artwork image 132 is already stored in the album artwork image cache 130. If the album artwork generator 128 determines that the album artwork image 132 is stored in the album artwork image cache 130, then the album artwork generator 128 can subsequently determine whether (1) the artist image 104 incorporated into the album artwork image 132 has been updated since the album artwork image 132 was generated, and/or (2) whether the album artwork template entry 172 on which the album artwork image 132 was based has been updated. If either of the foregoing conditions are satisfied, then the album artwork generator 128 can be configured to generate a new album artwork image 132 based on the new artist image 104 and/or the new album artwork template entry 172. In turn, the album artwork generator 128 can replace the existing album artwork image 132 stored in the album artwork image cache 130 with the new album artwork image 132.

FIGS. 3A-3G illustrate conceptual diagrams for generating album artwork images 132 in response to album artwork requests 150 issued by client computing devices 142, according to some embodiments. Although the following sequences are described in succession, it should be appreciated that the order of the sequences can be modified without departing from the scope of this disclosure.

Figure 3A:
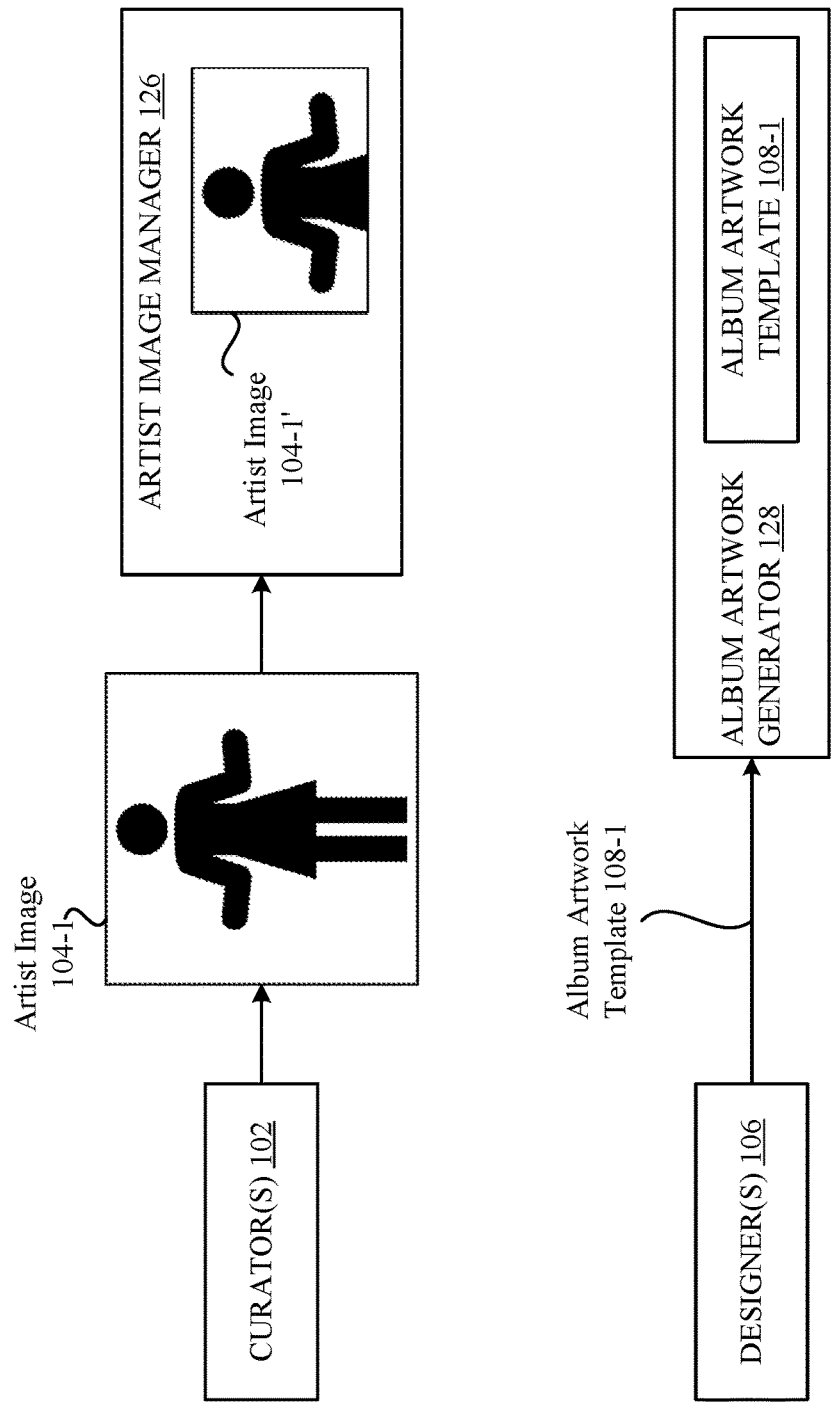
FIGS. 3A-3G illustrate conceptual diagrams for generating album artwork images in response to album artwork requests issued by client computing devices, according to some embodiments.

As shown in diagram 300 of FIG. 3A, a first sequence can involve one or more curators 102 providing an artist image 104-1 to the artist image manager 126. In turn, the artist image manager 126 can implement the machine learning techniques (e.g., as described above) to produce a modified artist image 104-1' that focuses on one or more individuals included in the artist image 104-1. As also shown in diagram 300 of FIG. 3A, a second sequence can involve one or more designers 106 providing an album artwork template 108—specifically, the album artwork template 108-1 described above and illustrated in FIG. 2B—to the album artwork generator 128. In turn, the album artwork generator 128 can perform any number of translation operations (e.g., as described above) on the album artwork templates 108 to optimize the manner in which the album artwork generator 128 is able to produce album artwork images 132 in accordance with the album artwork template entries 172 included in the album artwork template 108-1.

Figure 3B:
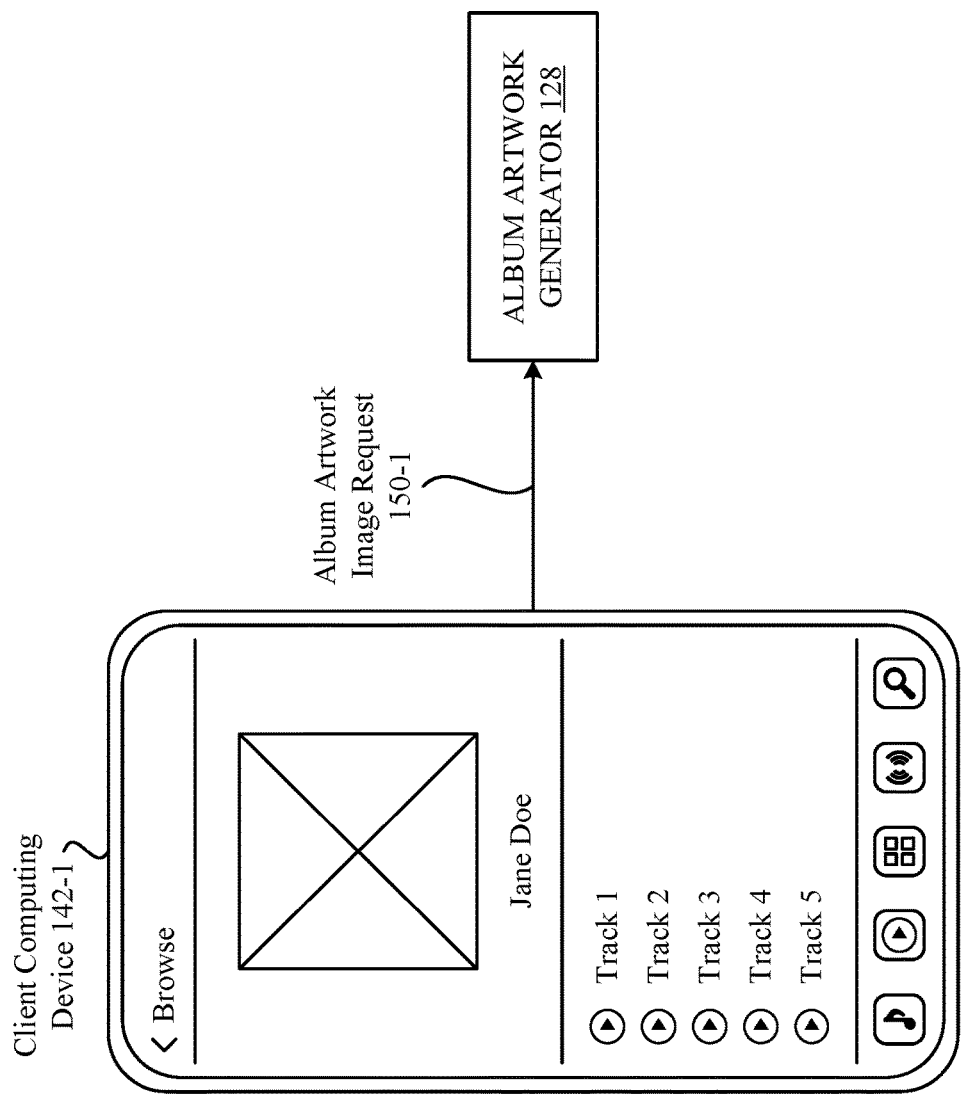

Turning now to the diagram 310 of FIG. 3B, a third sequence can involve a client computing device 142-1 issuing an album artwork request 150-1 to the album artwork generator 128. In this example, the client computing device 142-1 (e.g., the media application 148 executing thereon) issues the album artwork request 150-1 in response to an input from a user to access a playlist associated with the artist "Jane Doe". According to some embodiments, the client computing device 142-1 can populate the album artwork request 150-1 with information that enables the album artwork generator 128 to provide the appropriate album artwork image 132. For example, the artist image identifier 162 can be assigned a value that is obtained in conjunction with accessing the playlist associated with the artist. Similarly, the album artwork template identifier 171 can be assigned a value that is also obtained in conjunction with accessing the playlist associated with the artist. In this manner, both the artist image identifier 162 and the album artwork template identifier 171 are assigned values that are known to the server computing devices 122.

The image size 190 of the album artwork request 150-1 can be assigned a value based on the size that is desired for the album artwork image 132, e.g., a width and a height that is based on one or more of a physical form factor of the client computing device 142-1, a screen resolution of the client computing device 142-1, an active orientation of the client computing device 142-1, user interface design characteristics of the media application 148, and so on. It is noted that the foregoing examples are not meant to be limiting and that any consideration can be made when assigning a value to the image size 190.

Continuing on, the color profile 192 can also be assigned a value based on any number of considerations, including surrounding user interface colors that are based on user settings (e.g., a light mode or a dark mode), user interface design characteristics, and the like. It is noted that the foregoing examples are not meant to be limiting and that any consideration can be made when assigning a value to the color profile 192.

Figure 3C:
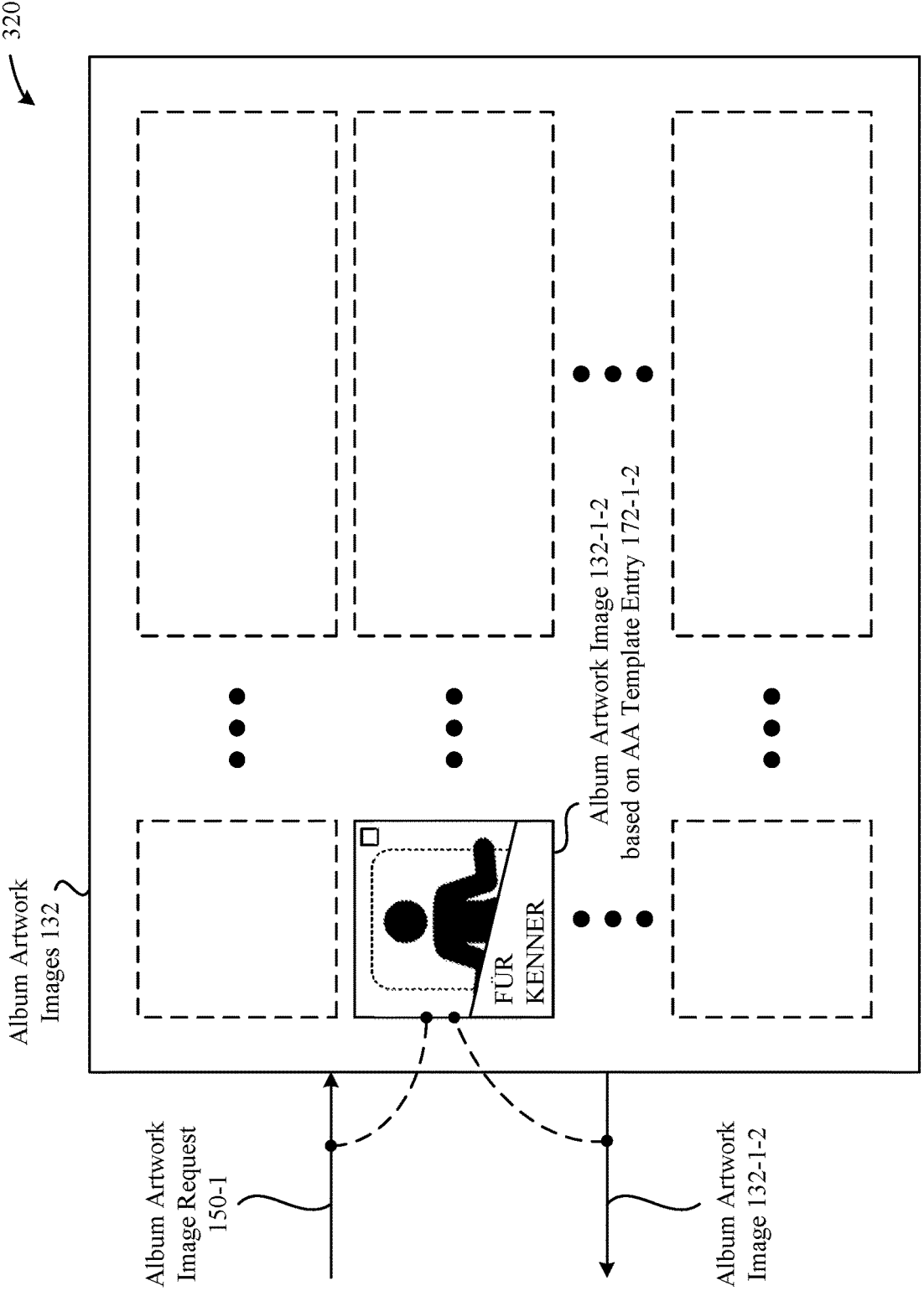

Additionally, the locale information 146 can be assigned a value that is based on a preferred language—German, as will be shown in FIG. 3C—of a user of the client computing device 142-1. The preferred language can be a static value that guarantees a consistent experience for the user, or a dynamic value that changes based on one or more considerations, e.g., a time of day, a physical location of the client computing device 142-1, and so on. It is noted that the foregoing examples are not meant to be limiting and that any consideration can be made to implement dynamic values for the preferred language of the client computing device 142-1.

Turning now to the diagram 320 of FIG. 3C, a fourth sequence can involve the album artwork generator 128 generating an album artwork image 132 in accordance with the album artwork request 150-1. In the example illustrated in FIG. 3C, the album artwork generator 128 utilizes the album artwork template identifier 171 to retrieve the album artwork template 108-1. As a brief aside, it is noted that the album artwork generator 128 can assign two or more album artwork templates 108 to a particular album artwork template identifier 171 to enable multilayering techniques. For example, an album artwork request 150 that references the album artwork template identifier 171 that references two or more album artwork templates 108 can cause the album artwork generator 128 to combine the alum artwork template entry layers 176 belonging to the two or more album artwork templates 108.

Turning back now to FIG. 3C, the album artwork generator 128 can utilize one or more of the image size 190, the color profile 192, and the locale info 146, to identify the album artwork template entry 172 that corresponds to the album artwork request 150-1—in this case, the album artwork template entry 172-1-2 illustrated in FIG. 2B. Additionally, the album artwork generator 128 utilizes the artist image identifier 162 retrieve the artist image 104-1' (established in FIG. 3A).

Equipped with the necessary information—i.e., the artist image 104-1 and the album artwork template entry 172-1-2—the album artwork generator 128 generates an album artwork image 132-1-2 (e.g., in accordance with the techniques described above in conjunction with FIG. 2A). Although not illustrated in FIG. 3C, the album artwork generator 128 can be configured to store the album artwork image 132-1-2 into the album artwork image cache 130 in accordance with the techniques described above in conjunction with FIG. 1A.

Figure 3D:
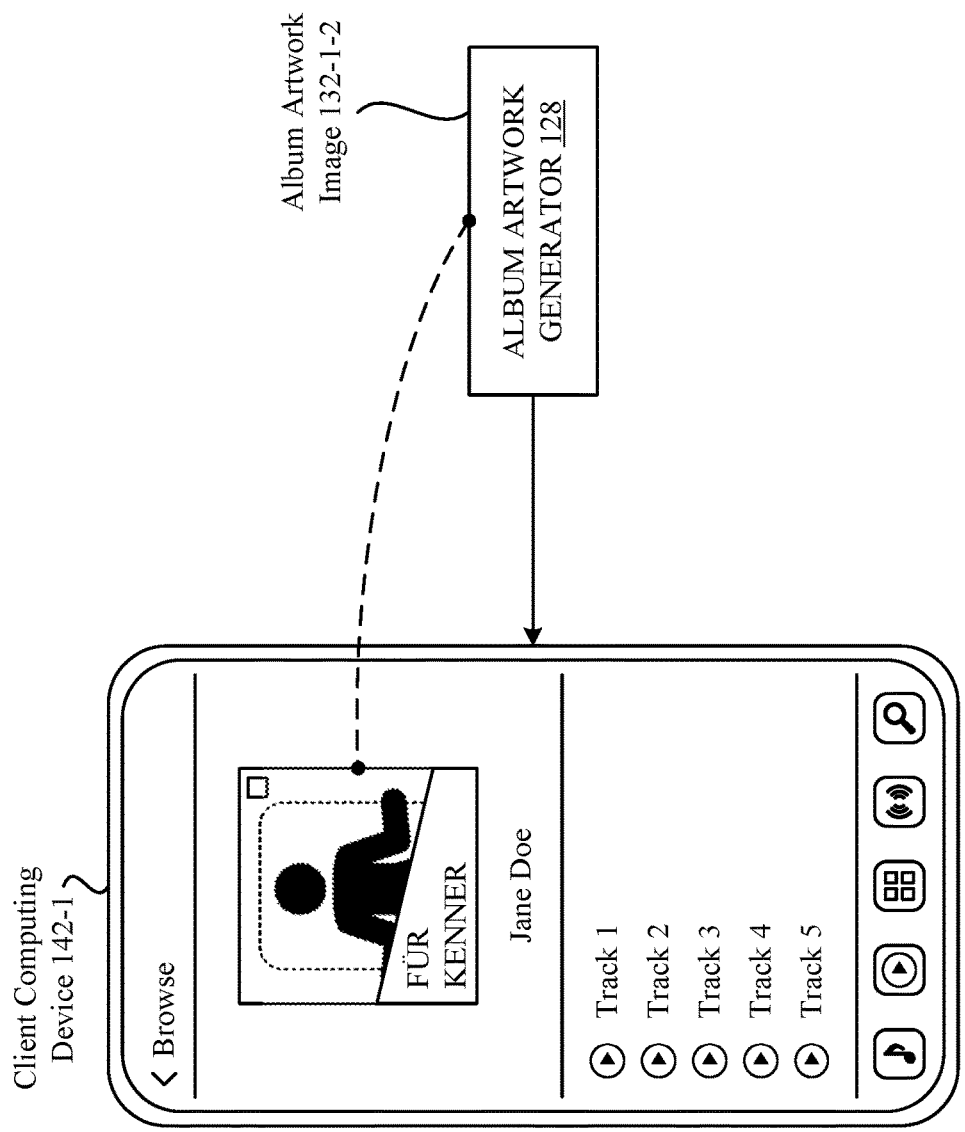

Turning now to the diagram 330 of FIG. 3D, a fifth sequence can involve the client computing device 142-1 receiving the album artwork image 132-1-2 from the album artwork generator 128 and displaying the album artwork image 132-1-2 (e.g., on a display device that is communicably coupled to the client computing device 142-1).

Figure 3E:
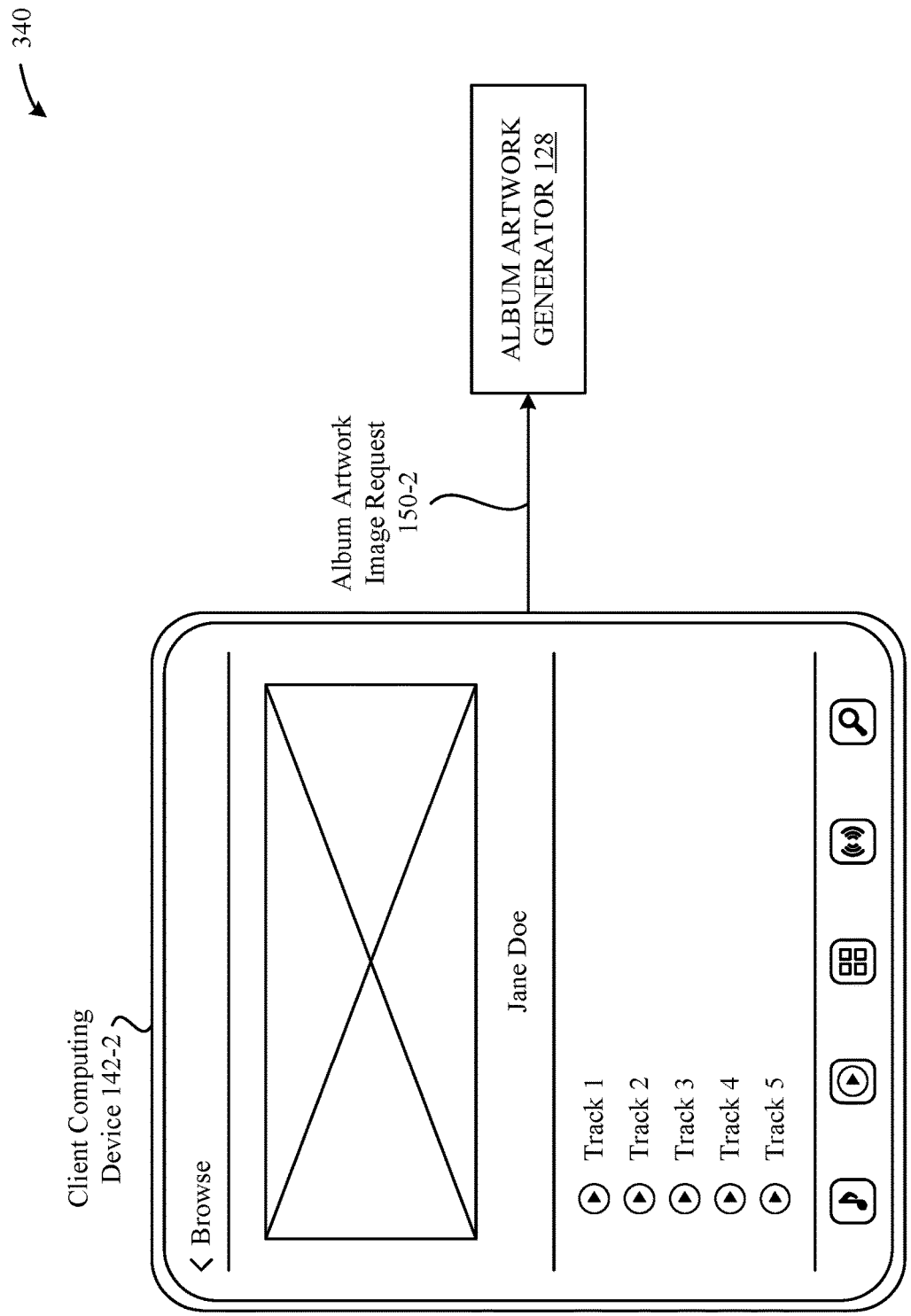

Turning now to the diagram 340 of FIG. 3E, a sixth sequence can involve a client computing device 142-2 issuing an album artwork request 150-2 to the album artwork generator 128. In this example, the client computing device 142-2 issues the album artwork request 150-2 in response to an input from a user to access a playlist associated with the artist "Jane Doe". According to some embodiments, the client computing device 142-2 can populate the album artwork request 150-2 with information that enables the album artwork generator 128 to provide the appropriate album artwork image 132, e.g., as described above in conjunction with FIG. 3B. However, in this example sequence, the album artwork request 150-2 is distinct from the album artwork request 150-1 given (1) the client computing device 142-2 has a different form factor/screen size relative to the client computing device 142-1, and (2) the client computing device 142-2 is assigned a preferred language (English) that is distinct from the preferred language of the client computing device 142-1 (German). In this regard, the image size 190 and the locale information 146 of the album artwork request 150-2 possess different values relative to those assigned to the album artwork request 150-1.

Figure 3F:
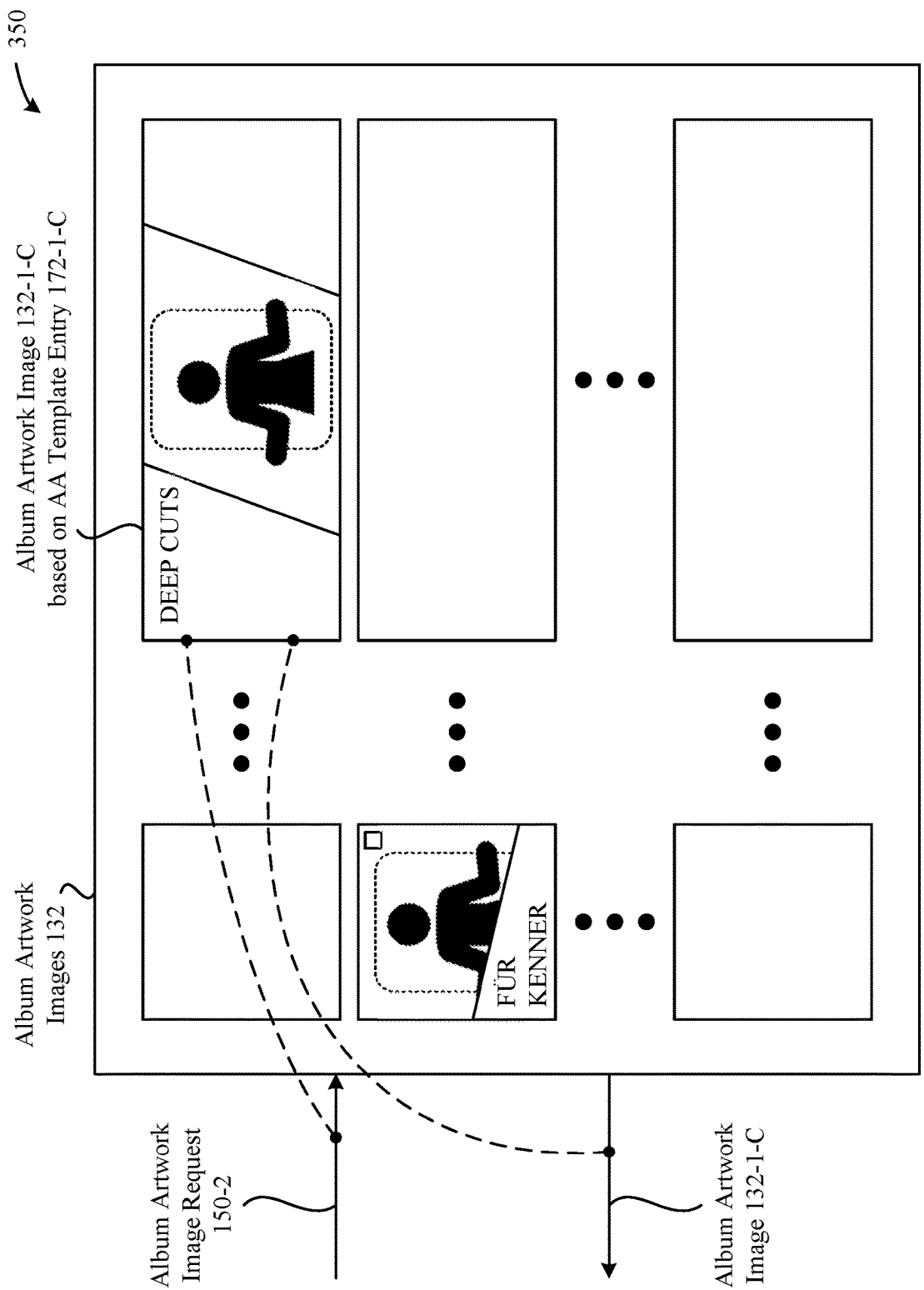

Turning now to the diagram 350 of FIG. 3F, a seventh sequence can involve the album artwork generator 128 generating an album artwork image 132 in accordance with the album artwork request 150-2. In the example illustrated in FIG. 3F, the album artwork generator 128 utilizes the album artwork template identifier 171 to retrieve the album artwork template 108-1. Moreover, the album artwork generator 128 utilizes one or more of the image size 190, the color profile 192, and the locale info 146, to identify the album artwork template entry 172 that corresponds to the album artwork request 150-1—in this case, the album artwork template entry 172-1-C illustrated in FIG. 2B. Additionally, the album artwork generator 128 utilizes the artist image identifier 162 retrieve the artist image 104-1' (established in FIG. 3A).

Equipped with the necessary information—i.e., the artist image 104-1 and the album artwork template entry 172-1-C—the album artwork generator 128 generates an album artwork image 132-1-C (e.g., in accordance with the techniques described above in conjunction with FIG. 2A). Although not illustrated in FIG. 3C, the album artwork generator 128 can be configured to store the album artwork image 132-1-C into the album artwork image cache 130 in accordance with the techniques described above in conjunction with FIG. 1A.

Figure 3G:
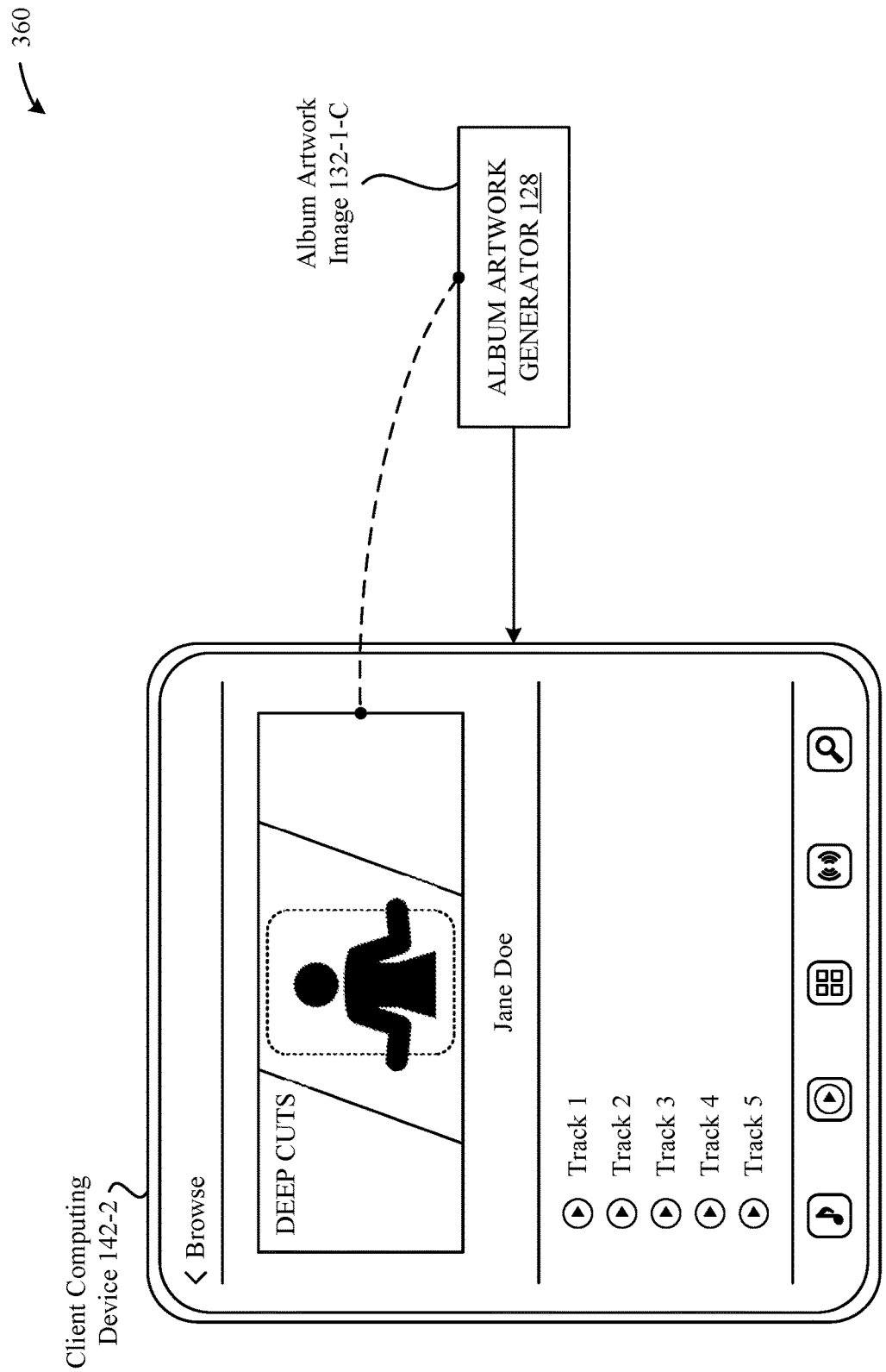

Turning now to the diagram 360 of FIG. 3G, an eighth sequence can involve the client computing device 142-2 receiving the album artwork image 132-1-C from the album artwork generator 128 and displaying the album artwork image 132-1-C (e.g., on a display device that is communicably coupled to the client computing device 142-2).

Figure 4A:
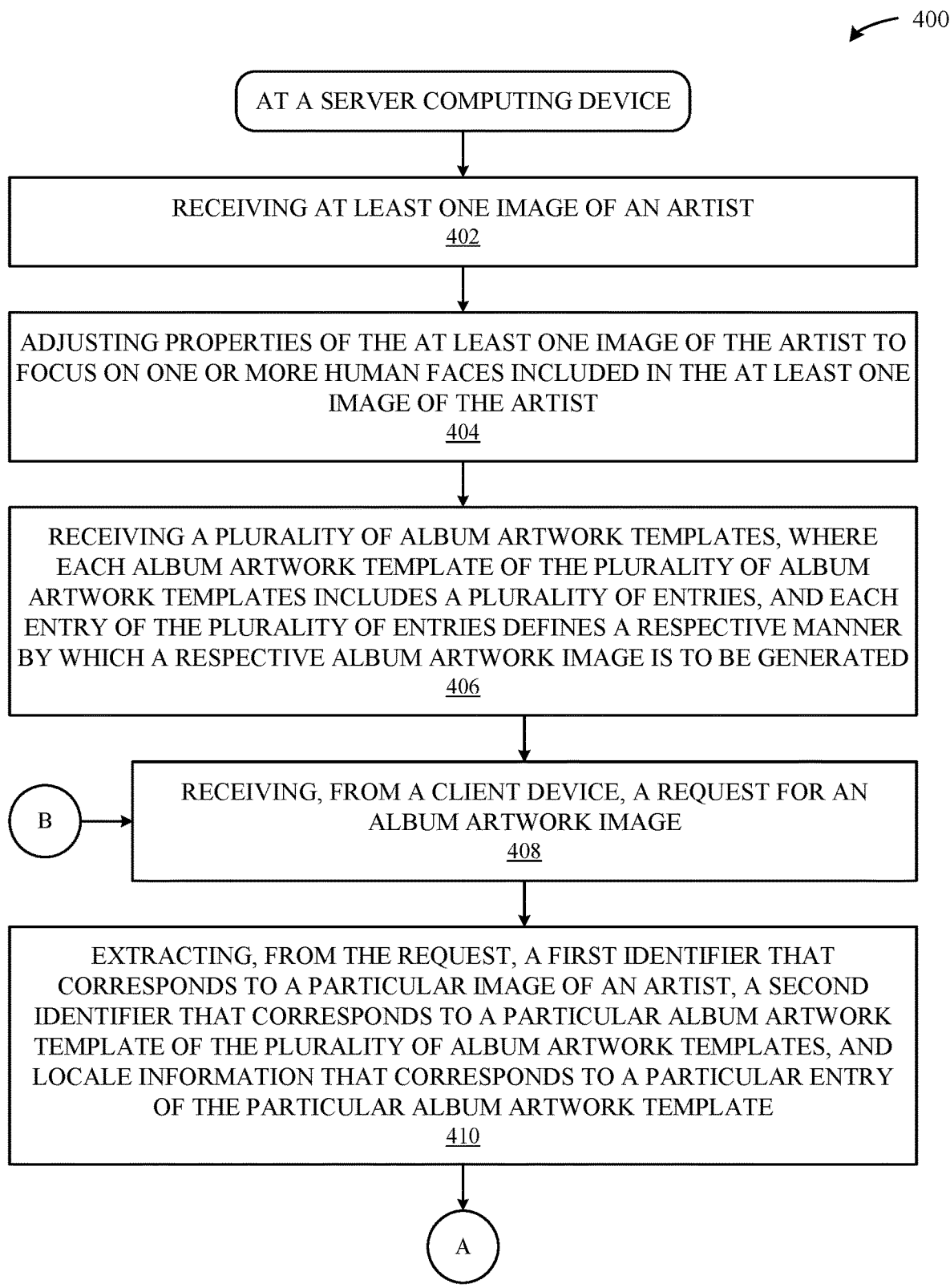
FIGS. 4A-4B illustrate a method for generating album artwork images that can be implemented by a server computing device, according to some embodiments.
Figure 4B:
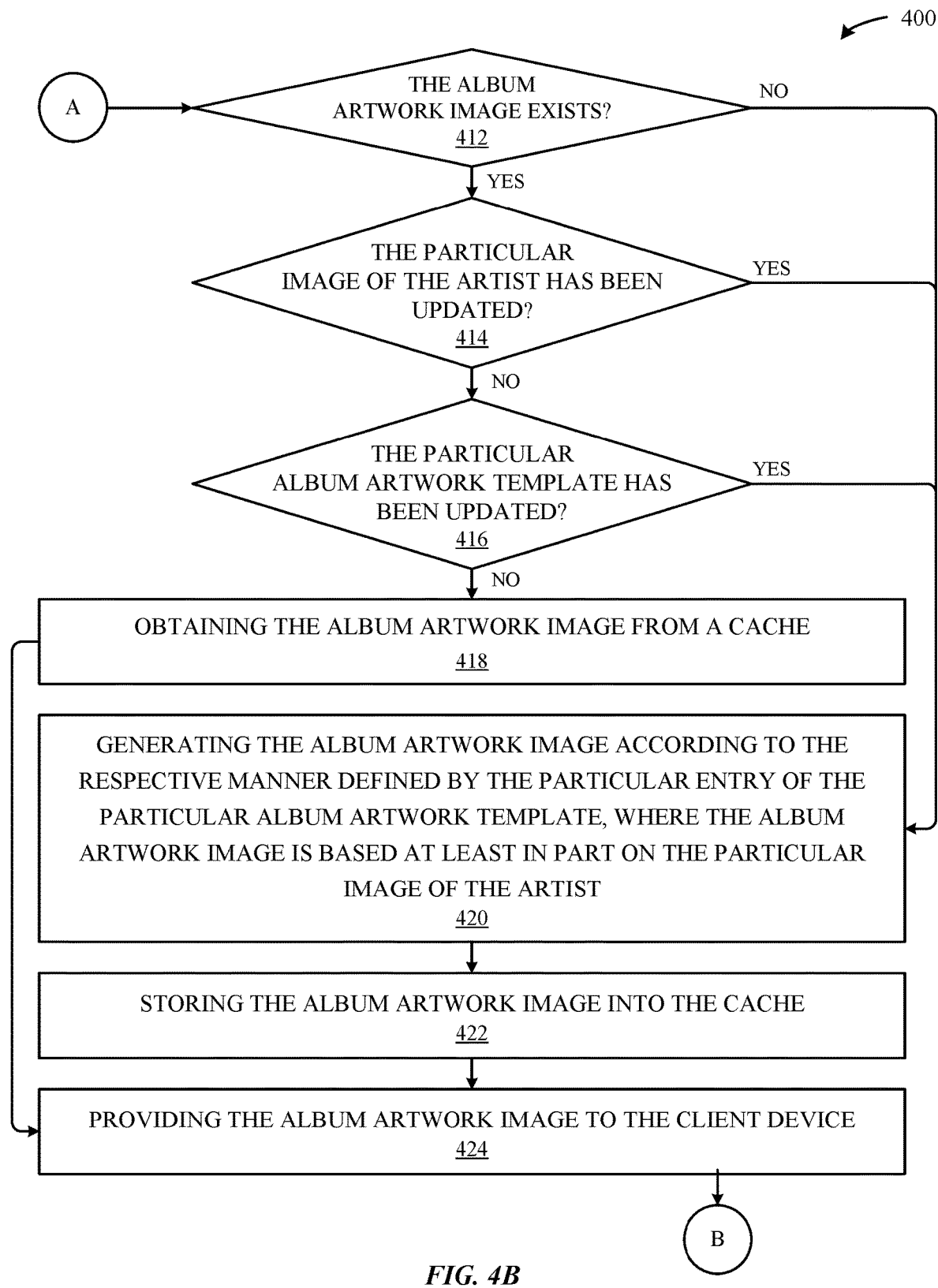

FIGS. 4A-4B illustrate a method 400 for generating album artwork images that can be implemented by a server computing device 122, according to some embodiments. As shown in FIG. 4A, the method 400 begins at step 402, where the server computing device 122 receives at least one image of an artist (e.g., an artist image 104). At step 404, the server computing device 122 adjusts properties of the at least one image of the artist to focus on one or more human faces included in the at least one image of the artist (e.g., as described herein).

At step 406, the server computing device 122 receives a plurality of album artwork templates (e.g., the album artwork templates 108), where each album artwork template of the plurality of album artwork templates includes a plurality of entries (e.g., album artwork template entries 172), and each entry of the plurality of entries defines a respective manner by which a respective album artwork image (e.g., an album artwork image 132) is to be generated (e.g., based on the album artwork template entry layers 176).

At step 408, the server computing device 122 receives, from a client device (e.g., a client computing device 142), a request for an album artwork image (e.g., an album artwork image 132). At step 410, the server computing device 122 extracts, from the request, a first identifier (e.g., an artist image identifier 162) that corresponds to a particular image of an artist, a second identifier (e.g., an album artwork template identifier 171) that corresponds to a particular album artwork template of the plurality of album artwork templates, and locale information (e.g., local information 146) that corresponds to a particular entry of the particular album artwork template. Although not illustrated in FIG. 4A, the request can also include image size information (e.g., image size 190), color profile information (e.g., color profile 192), and the like, as described herein, to enable the server computing device 122 to identify an appropriate album artwork template entry of the album artwork template on which the album artwork image should be based.

Turning now to FIG. 4B, at step 412, the server computing device 122 determines whether the album artwork image exists. This can involve, for example, referencing the album artwork image cache 130 to determine whether the album artwork image was previously generated in response to an identical request. If, at step 412, the server computing device 122 determines that the album artwork image exists, then the method 400 proceeds to step 414. Otherwise, the method 400 proceeds to step 420 to generate the album artwork image, which is described below in greater detail.

At step 414, the server computing device 122 determines whether the particular image of the artist has been updated. This can involve, for example, determining whether one or more curators 102 have uploaded a newer image of the artist relative to the time at which the particular image of the artist was previously generated. If, at step 414, the server computing device 122 determines that the particular image of the artist has been updated, then the method 400 proceeds to step 420 to generate the album artwork image, which is described below in greater detail. Otherwise, the method 400 proceeds to step 416.

At step 416, the server computing device 122 determines whether the particular album artwork template has been updated (e.g., by one or more designers 106). If, at step 416, the server computing device 122 determines that the particular album artwork template has been updated, then the method 400 proceeds to step 420 to generate the album artwork image, which is described below in greater detail. Otherwise, the method 400 proceeds to step 418, where the server computing device 122 obtains the album artwork image from a cache (e.g., the album artwork image cache 130).

Accordingly, step 420 is performed (1) when the album artwork image has not yet been generated, or (2) when the album artwork image was generated at a previous time, but since that time, the particular image of the artist—and/or the particular album artwork template—has/have been updated. In either case, the server computing device 122 generates the album artwork image according to the respective manner defined by the particular entry of the particular album artwork template (e.g., as described herein), where the album artwork image is based at least in part on the particular image of the artist.

At step 422, the server computing device 122 stores the album artwork image into the cache. Finally, at step 424, the server computing device 122 provides the album artwork image to the client device.

Figure 5:
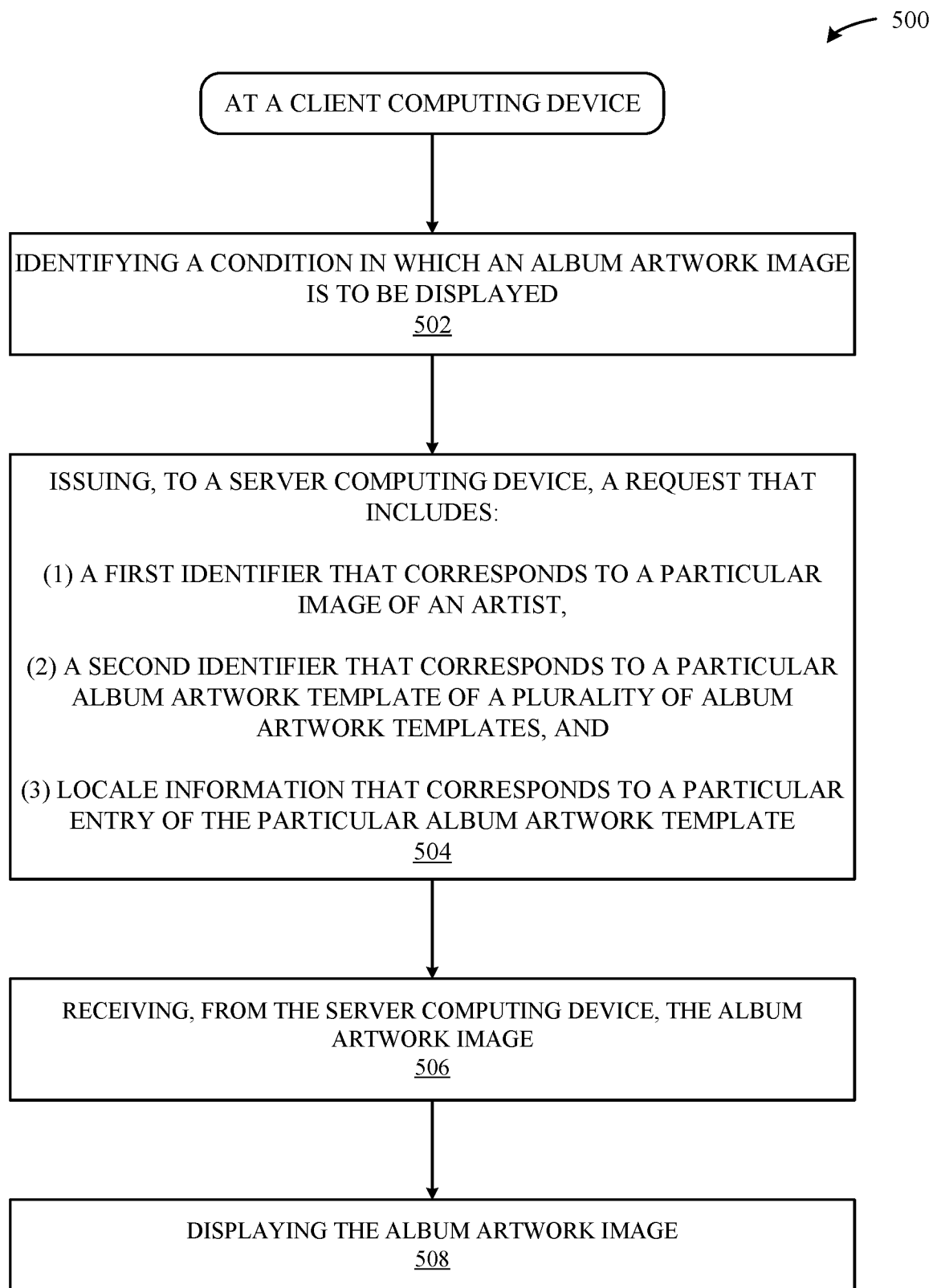
FIG. 5 illustrates a method for issuing requests for album artwork images that can be implemented by a client computing device, according to some embodiments.

Additionally, FIG. 5 illustrates a method 500 for issuing requests for album artwork images that can be implemented by one of the client computing devices 142, according to some embodiments. As shown in FIG. 5, the method 500 begins at step 502, where the client computing device 142 identifies a condition in which an album artwork image (e.g., an album artwork image 132) is to be displayed. At step 504, the client computing device 142 issues, to a server computing device (e.g., a server computing device 122), a request (e.g., an album artwork request 150) that includes: (1) a first identifier (e.g., an artist image identifier 162) that corresponds to a particular image of an artist (e.g., an artist image 104), (2) a second identifier (e.g., an album artwork template identifier 171) that corresponds to a particular album artwork template (e.g., an album artwork template 108) of a plurality of album artwork templates, and (3) locale information (e.g., local information 146) that corresponds to a particular entry (e.g., an album artwork template entry 172) of the particular album artwork template.

At step 506, the client computing device 142 receives, from the server computing device, the album artwork image. As previously described herein, the server computing device can generate the album artwork image in response to the request issued at step 520 when certain conditions are satisfied, or obtain the album artwork image from the album artwork image cache 130 when certain conditions are satisfied. At step 540, the client computing device 142 displays the album artwork image (e.g., on a display device that is communicably coupled to the client computing device 142.

It is noted that the descriptions set forth are not limited to image-based album artwork only. On the contrary, designers 106 can be permitted to submit album artwork templates 108 having one or more album artwork template entries 172 that incorporate one or more video layers. For example, an album artwork template entry 172 of a given album artwork template 108 can incorporate a background layer 202 (or other layer) that includes a video (e.g., a recorded video, a programmed animation, etc.). Moreover, curators 102 can be permitted to submit artist images 104 that incorporate a video (e.g., a recorded video, a programmed animation, etc.) that is placed into the artist image placeholder layer 206 of a given album artwork template entry 172 when generating a corresponding album artwork image 132. It is noted that the artist image manager 126 can, upon receipt of a video-based album artwork image 132, implement machine learning techniques similar to those previously described herein that involve focusing on one or more individuals that are included in the video-based album artwork image 132.

Additionally, it is noted that the album artwork generator 128 can be configured to receive a batch collection of album artwork images and automatically insert one or more word-marks into the album artwork images. According to some embodiments, the album artwork generator 128 can be configured to identify, based on the respective design characteristics of (1) a given album artwork image, and (2) a wordmark that is to be inserted into the album artwork image, an optimal placement location, size, and color for the wordmark, and insert the wordmark accordingly. Inserting the wordmark can involve generating a flattened (i.e., composite) album artwork image that includes the wordmark. Alternatively, the wordmark can be inserted as a layer such that enhanced display functionalities (e.g., a parallax effect) can be implemented.

Additionally, it is noted that the artist image manager 126 can enable curators to associate rules with artist images 104 to control the manner in which the artist images 104 are utilized when generating album artwork images 132. This can be useful, for example, to enable artists to comply with various restrictions that may be imposed in accordance with geographical terms, business model terms, and so on. To achieve this functionality, a curator 102 can be permitted to provide, for a given artist, (1) a group of artist images 104, and (2) a set of rules that define how different artist images 104 of the group of artist images 104 should be selected. When such a provision is made, the artist image manager 126 can assign an artist image identifier 162 to the set of rules instead of a single artist image 104. In this regard, when the artist image manager 126 receives a request that references the artist image identifier 162, the artist image manager 126 will know to refer to the set of rules to identify the appropriate artist image 104 to return. This can involve, for example, identifying an appropriate an artist image 104 based on the locale information 146, the image size 190, the color profile 192, or other information included in the album artwork request 150. It is noted that the foregoing examples are not meant to be limiting, and that any number of artist images 104 can be assigned any number of rules without departing from the scope of this disclosure.

Additionally, it is noted that although album artwork images are primarily discussed throughout this disclosure, the embodiments are not limited only to generating album artwork images. On the contrary, the various templates described herein can incorporate all types and any number of layers that enable images, animations, videos, and so on, to be generated without departing from the scope of this disclosure. It is additionally noted that the generated content (i.e., images, videos, animations, etc.) can be assigned to objects other than albums, such as playlists, radio stations, TV shows, movies, videos, software applications, news articles, and so on. It is noted that the foregoing examples are not meant to be limiting, and that the generated content can be assigned to any object without departing from the scope of this disclosure.

Figure 6:
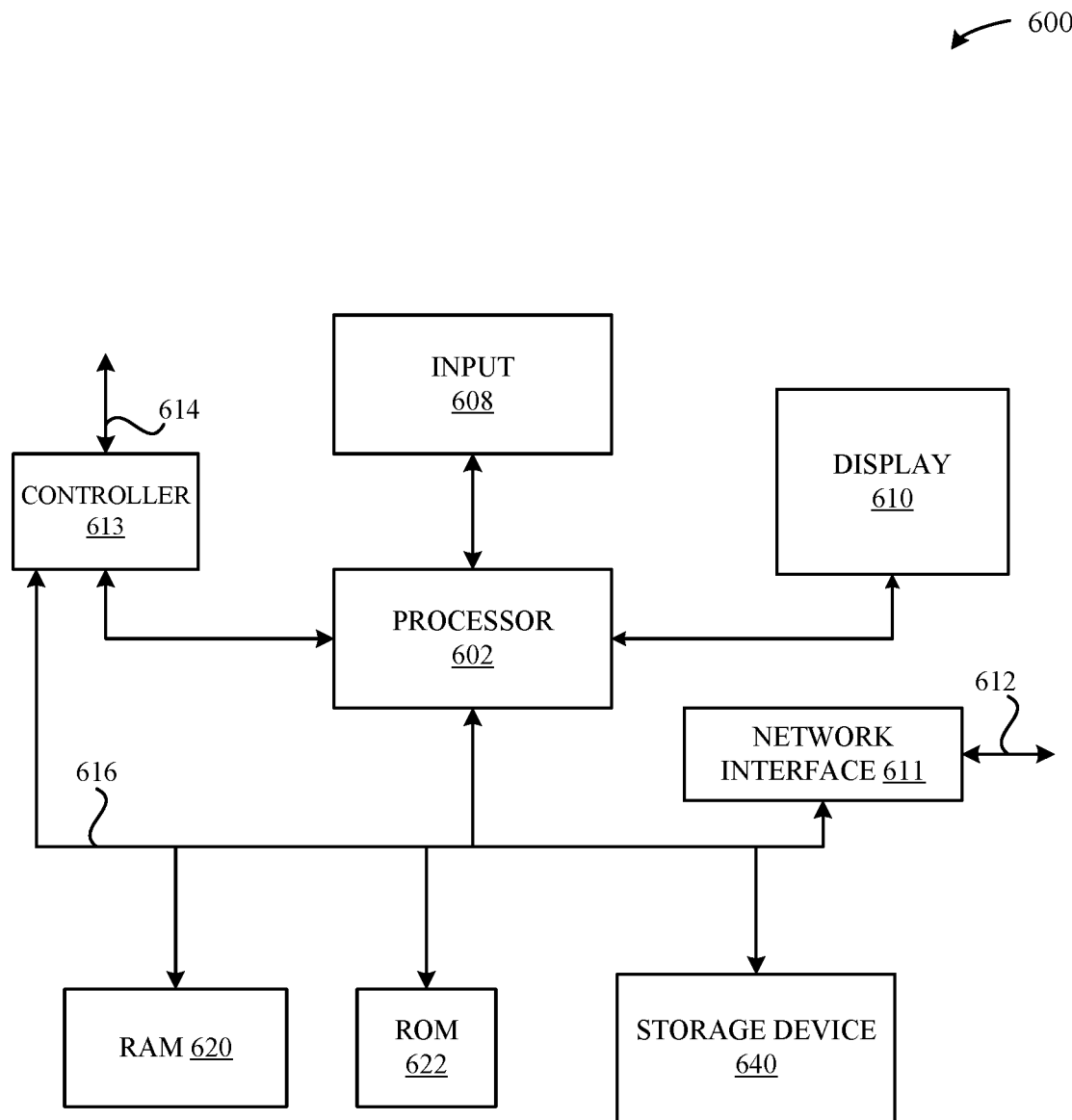
FIG. 6 illustrates a detailed view of a computing device that can be configured to implement the various techniques described herein, according to some embodiments.

FIG. 6 illustrates a detailed view of a computing device 600 that can represent the different computing devices of FIG. 1A used to implement the various techniques described herein, according to some embodiments. For example, the detailed view illustrates various components that can be included in the server computing devices 122 and the client computing devices 142 described above in conjunction with FIG. 1A. As illustrated in FIG. 6, the computing device 600 can include at least one processor 602 that represents a microprocessor or controller for controlling the overall operation of the computing device 600. The computing device 600 can also include a user input device 608 that allows a user of the computing device 600 to interact with the computing device 600. For example, the user input device 608 can take a variety of forms, such as a button, keypad, dial, touch screen, audio input interface, visual/image capture input interface, input in the form of sensor data, and so on. Still further, the computing device 600 can include a display 610 that can be controlled by the at least one processor 602 (e.g., via a graphics component) to display information to the user. A data bus 616 can facilitate data transfer between at least one storage device 640, the at least one processor 602, and a controller 613. The controller 613 can be used to interface with and control different equipment through an equipment control bus 614. The computing device 600 can also include a network/bus interface 611 that couples to a data link 612. In the case of a wireless connection, the network/bus interface 611 can include a wireless transceiver.

As noted above, the computing device 600 also includes the at least one storage device 640, which can comprise a single disk or a collection of disks (e.g., hard drives). In some embodiments, the at least one storage device 640 can include flash memory, semiconductor (solid state) memory or the like. The computing device 600 can also include at least one Random-Access Memory (RAM) 620 and at least one Read-Only Memory (ROM) 622. The at least one ROM 622 can store programs, utilities, or processes to be executed in a non-volatile manner. The at least one RAM 620 can provide volatile data storage and can store instructions related to the operation of applications executing on the computing device 600.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for generating album artwork images, the method comprising, at a server computing device:
   managing a plurality of album artwork templates, wherein each album artwork template of the plurality of album artwork templates includes a plurality of entries, and each entry of the plurality of entries defines a respective manner by which a respective album artwork image is to be generated;
   receiving, from a client device, a request for an album artwork image, wherein the request includes:
      a first identifier that corresponds to a particular image of an artist,
      a second identifier that corresponds to a particular album artwork template of the plurality of album artwork templates, and
      locale information that corresponds to a particular entry of the particular album artwork template; and
   generating the album artwork image according to the respective manner defined by the particular entry, wherein the album artwork image is based at least in part on the particular image of the artist.

2. The method of claim 1, further comprising:
   caching the album artwork image such that the album artwork image is provided to other client devices without requiring a regeneration of the album artwork image when:
      the other client devices issue requests identical to the request,
      the particular image of the artist has not been updated, and
      the particular album artwork template has not been updated.

3. The method of claim 1, wherein a given entry of a given album artwork template defines:
   at least one background layer;
   at least one frame/mask layer;
   a placeholder layer for an artist image;
   at least one overlay layer;
   at least one textual layer written in a particular language; and
   at least one wordmark layer.

4. The method of claim 3, wherein the album artwork image:
   is a composite image of one or more of the layers defined by the particular entry; or
   is an object that includes one or more of the layers defined by the particular entry.

5. The method of claim 1, wherein:
   the request further includes a size for the album artwork image and/or a color profile for the album artwork image; and
   the album artwork image, when generated, is further based on the size and/or the color profile.

6. The method of claim 1, wherein each entry of the plurality of entries included in a given album artwork template corresponds to a respective different language.

7. The method of claim 1, further comprising, prior to receiving the request:
   receiving, from an entity associated with the artist, the particular image of the artist; and
   adjusting borders and/or zoom properties of the particular image of the artist to focus on one or more human faces included in the particular image of the artist.

8. A non-transitory computer readable storage medium configured to store instructions that, when executed by a processor included in a server computing device, cause the server computing device to generate album artwork images, by carrying out steps that include:
   managing a plurality of album artwork templates, wherein each album artwork template of the plurality of album artwork templates includes a plurality of entries, and each entry of the plurality of entries defines a respective manner by which a respective album artwork image is to be generated;
   receiving, from a client device, a request for an album artwork image, wherein the request includes:
      a first identifier that corresponds to a particular image of an artist,
      a second identifier that corresponds to a particular album artwork template of the plurality of album artwork templates, and
      locale information that corresponds to a particular entry of the particular album artwork template; and
   generating the album artwork image according to the respective manner defined by the particular entry, wherein the album artwork image is based at least in part on the particular image of the artist.

9. The non-transitory computer readable storage medium of claim 8, wherein the steps further include:
   caching the album artwork image such that the album artwork image is provided to other client devices without requiring a regeneration of the album artwork image when:
      the other client devices issue requests identical to the request,
      the particular image of the artist has not been updated, and
      the particular album artwork template has not been updated.

10. The non-transitory computer readable storage medium of claim 8, wherein a given entry of a given album artwork template defines:
    at least one background layer;
    at least one frame/mask layer;
    a placeholder layer for an artist image;
    at least one overlay layer;
    at least one textual layer written in a particular language; and
    at least one wordmark layer.

11. The non-transitory computer readable storage medium of claim 10, wherein the album artwork image:
    is a composite image of one or more of the layers defined by the particular entry; or
    is an object that includes one or more of the layers defined by the particular entry.

12. The non-transitory computer readable storage medium of claim 8, wherein:
    the request further includes a size for the album artwork image and/or a color profile for the album artwork image; and
    the album artwork image, when generated, is further based on the size and/or the color profile.

13. The non-transitory computer readable storage medium of claim 8, wherein each entry of the plurality of entries included in a given album artwork template corresponds to a respective different language.

14. The non-transitory computer readable storage medium of claim 8, wherein the steps further include, prior to receiving the request:
    receiving, from an entity associated with the artist, the particular image of the artist; and adjusting borders and/or zoom properties of the particular image of the artist to focus on one or more human faces included in the particular image of the artist.

15. A server computing device configured to generate album artwork images, the server computing device comprising:
- at least one processor; and
- at least one memory storing instructions that, when executed by the at least one processor, cause the server computing device to carry out steps that include:
  - managing a plurality of album artwork templates, wherein each album artwork template of the plurality of album artwork templates includes a plurality of entries, and each entry of the plurality of entries defines a respective manner by which a respective album artwork image is to be generated;
  - receiving, from a client device, a request for an album artwork image, wherein the request includes:
    - a first identifier that corresponds to a particular image of an artist,
    - a second identifier that corresponds to a particular album artwork template of the plurality of album artwork templates, and
    - locale information that corresponds to a particular entry of the particular album artwork template; and
  - generating the album artwork image according to the respective manner defined by the particular entry, wherein the album artwork image is based at least in part on the particular image of the artist.

16. The server computing device of claim 15, wherein the steps further include:
- caching the album artwork image such that the album artwork image is provided to other client devices without requiring a regeneration of the album artwork image when:
  - the other client devices issue requests identical to the request,
  - the particular image of the artist has not been updated, and
  - the particular album artwork template has not been updated.

17. The server computing device of claim 15, wherein a given entry of a given album artwork template defines:
- at least one background layer;
- at least one frame/mask layer;
- a placeholder layer for an artist image;
- at least one overlay layer;
- at least one textual layer written in a particular language; and
- at least one wordmark layer.

18. The server computing device of claim 17, wherein the album artwork image:
- is a composite image of one or more of the layers defined by the particular entry; or
- is an object that includes one or more of the layers defined by the particular entry.

19. The server computing device of claim 15, wherein:
- the request further includes a size for the album artwork image and/or a color profile for the album artwork image; and
- the album artwork image, when generated, is further based on the size and/or the color profile.

20. The server computing device of claim 15, wherein each entry of the plurality of entries included in a given album artwork template corresponds to a respective different language.

* * * * *